(12) United States Patent
Aase et al.

(10) Patent No.: US 12,245,001 B2
(45) Date of Patent: Mar. 4, 2025

(54) WIRELESS CHARGING WITH MAGNETIC RETENTION

(71) Applicant: Eargo, Inc., San Jose, CA (US)

(72) Inventors: Jonathan Sarjeant Aase, Incline Village, NV (US); David Whitington, South Lake Tahoe, CA (US)

(73) Assignee: Eargo, Inc., San Jose, CA (US)

( * ) Notice: Subject to any disclaimer, the term of this patent is extended or adjusted under 35 U.S.C. 154(b) by 117 days.

(21) Appl. No.: 17/854,563

(22) Filed: Jun. 30, 2022

(65) Prior Publication Data

US 2023/0007412 A1  Jan. 5, 2023

Related U.S. Application Data

(60) Provisional application No. 63/217,114, filed on Jun. 30, 2021.

(51) Int. Cl.
*H04R 25/00* (2006.01)
*H02J 50/10* (2016.01)

(52) U.S. Cl.
CPC ............ *H04R 25/656* (2013.01); *H02J 50/10* (2016.02); *H04R 25/50* (2013.01); *H04R 25/554* (2013.01); *H04R 25/65* (2013.01); *H04R 25/654* (2013.01); *H04R 25/658* (2013.01); *H04R 2225/025* (2013.01); *H04R 2225/31* (2013.01)

(58) Field of Classification Search
CPC .. H04R 2225/31; H04R 25/554; H04R 25/65; H04R 2225/023; H04R 2225/025; H04R 25/50; H04R 25/558; H04R 25/654; H04R 25/656; H04R 25/658
USPC ........................................................ 381/312
See application file for complete search history.

(56) References Cited

U.S. PATENT DOCUMENTS

| | | |
|---|---|---|
| 9,167,363 B2 | 10/2015 | Michel et al. |
| 9,432,781 B2 | 8/2016 | Herscher |
| 9,936,311 B2 | 4/2018 | Herscher |
| 10,097,936 B2 | 10/2018 | Barrett et al. |
| 10,284,977 B2 | 5/2019 | Shen et al. |
| 10,334,370 B2 | 6/2019 | Herscher |
| 10,771,883 B2 | 9/2020 | Aase et al. |
| 10,785,579 B2 | 9/2020 | Aase et al. |

FOREIGN PATENT DOCUMENTS

WO    WO-2020264354 A1 * 12/2020 ............. H04R 25/55

* cited by examiner

*Primary Examiner* — Phylesha Dabney
(74) *Attorney, Agent, or Firm* — Rutan & Tucker, LLP

(57) ABSTRACT

A magnet in a wireless charger and a ferromagnetic target plate in a hearing assistance device are used to create a magnetic retention force to hold the hearing assistance device in place when charging in order to control an amount of interference with a wireless charging occurring between the wireless charger and the hearing assistance device. A housing for the wireless charger has one or more storage areas. The contours of the storage areas each conform to a shape of the hearing assistance device that will be stored in that storage area.

18 Claims, 12 Drawing Sheets

Ferrite Shield

PCBA with integrated charging coils

190

Compliant Foam

Magnet

WIRELESS CHARGING WITH MAGNETIC RETENTION

RELATED PATENT APPLICATIONS

This patent application claims priority to and benefit of U.S. Provisional Application No. 63/217,114, filed 30 Jun. 2021, entitled An Improved Hearing Assistance System, the disclosure of each of which is hereby expressly incorporated by reference herein in its entirety.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

FIELD

Embodiments of the design provided herein generally relate to hearing assistance systems and methods. For example, embodiments of the design provided herein can relate to hearing aids.

BACKGROUND

Hearing aids work best if the user wants to wear the hearing aid and has its batteries charged. Preventing the hearing aid from being knocked out of charging position or even worse out of its storage case when walking with the hearing aids is also important.

SUMMARY

Provided herein in some embodiments is a hearing assistance system such as a hearing aid and/or ear bud.

In an embodiment, a magnet in a wireless charger and a ferromagnetic target plate in a hearing assistance device are used to create a magnetic retention force to hold the hearing assistance device in place when charging in order to control an amount of interference with a wireless charging occurring between the wireless charger and the hearing assistance device. A housing for the wireless charger has one or more storage areas. The contours of the storage areas each conform to a shape of the hearing assistance device that will be stored in that storage area.

These and other features of the design provided herein can be better understood with reference to the drawings, description, and claims, all of which form the disclosure of this patent application.

DRAWINGS

The drawings refer to some embodiments of the design provided herein as well as with the additional documents filed with this document which form this provisional patent application.

Figure 3:
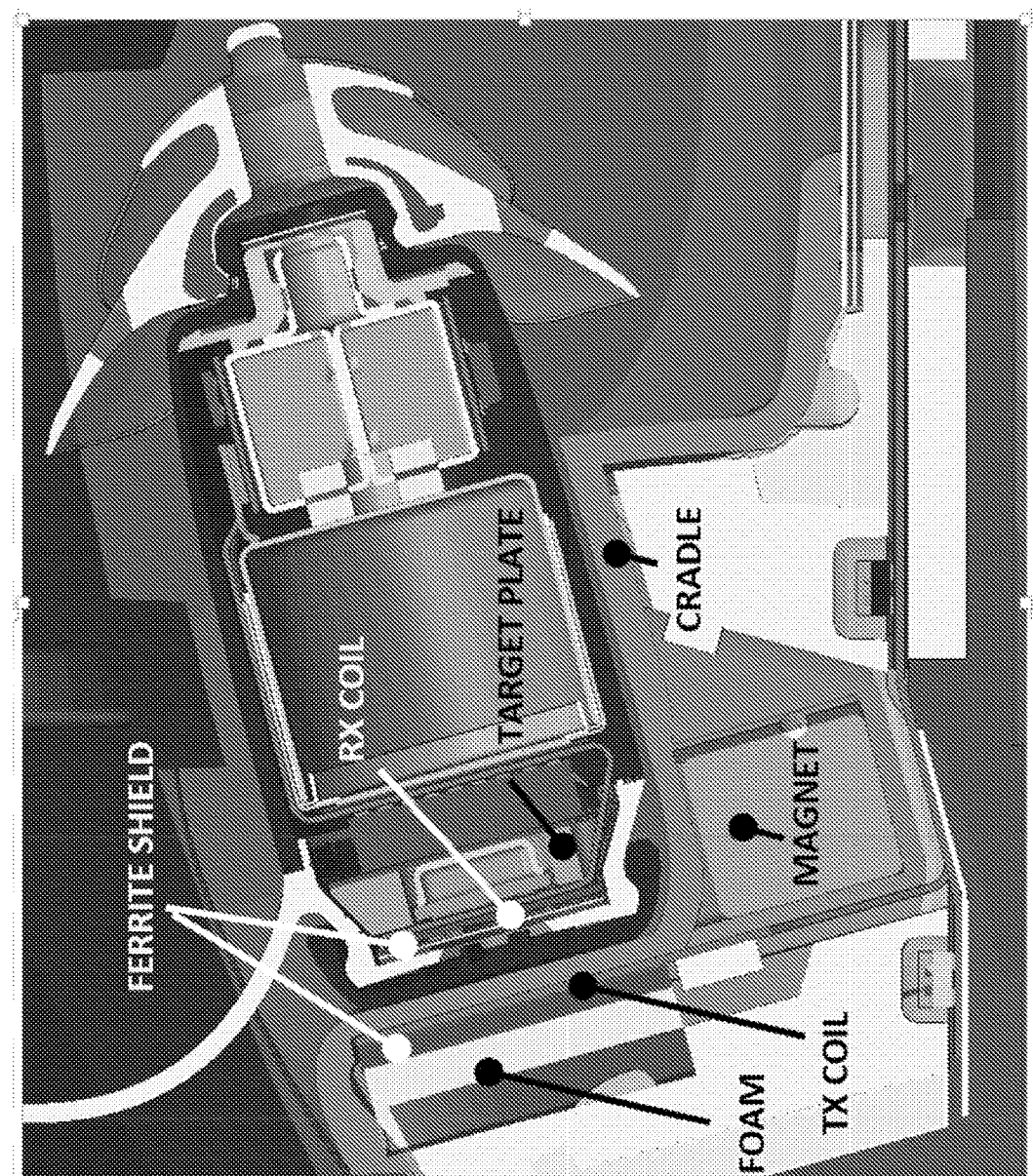
Figure 3:
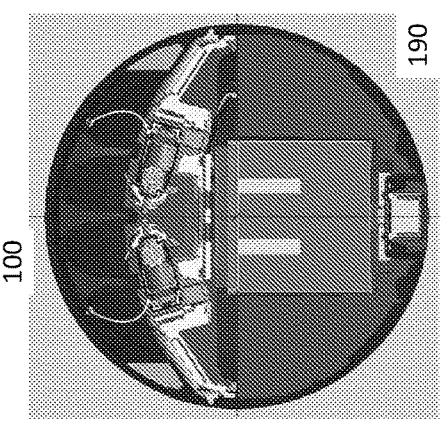

FIG. 3 illustrates a diagram of an embodiment of an example magnet in the wireless charger and a ferromagnetic target plate in a hearing assistance device that are used to create a magnetic retention force to hold each hearing assistance device in place when charging in order to control an amount of interference with a wireless charging between the wireless charger and the hearing assistance device(s).

Figure 4:
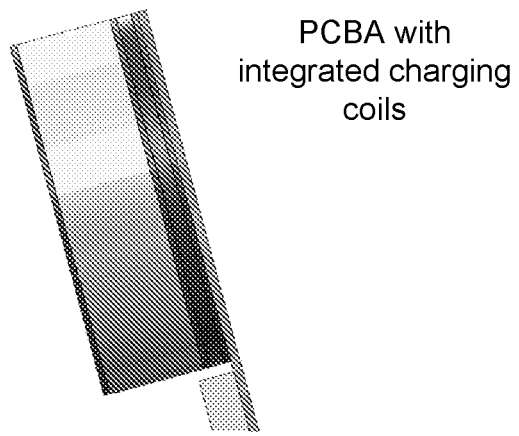
Figure 4:
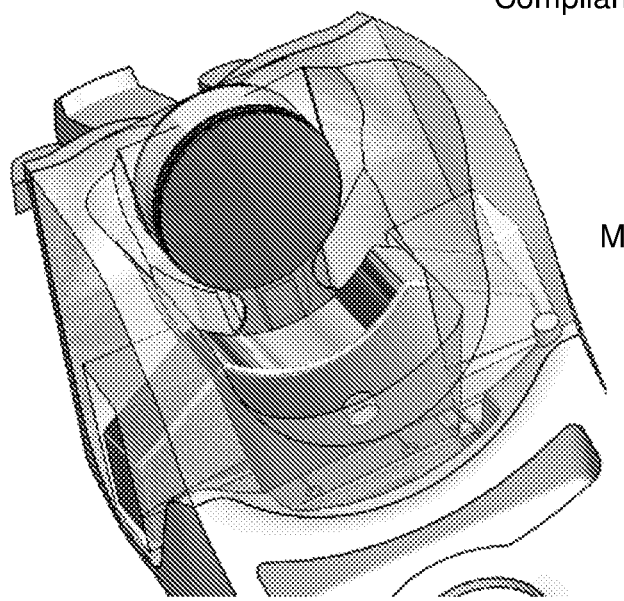

FIG. 4 illustrates a diagram of an embodiment of an example wireless charger housing that contains a transmit charging coil and a magnet.

Figure 5A:
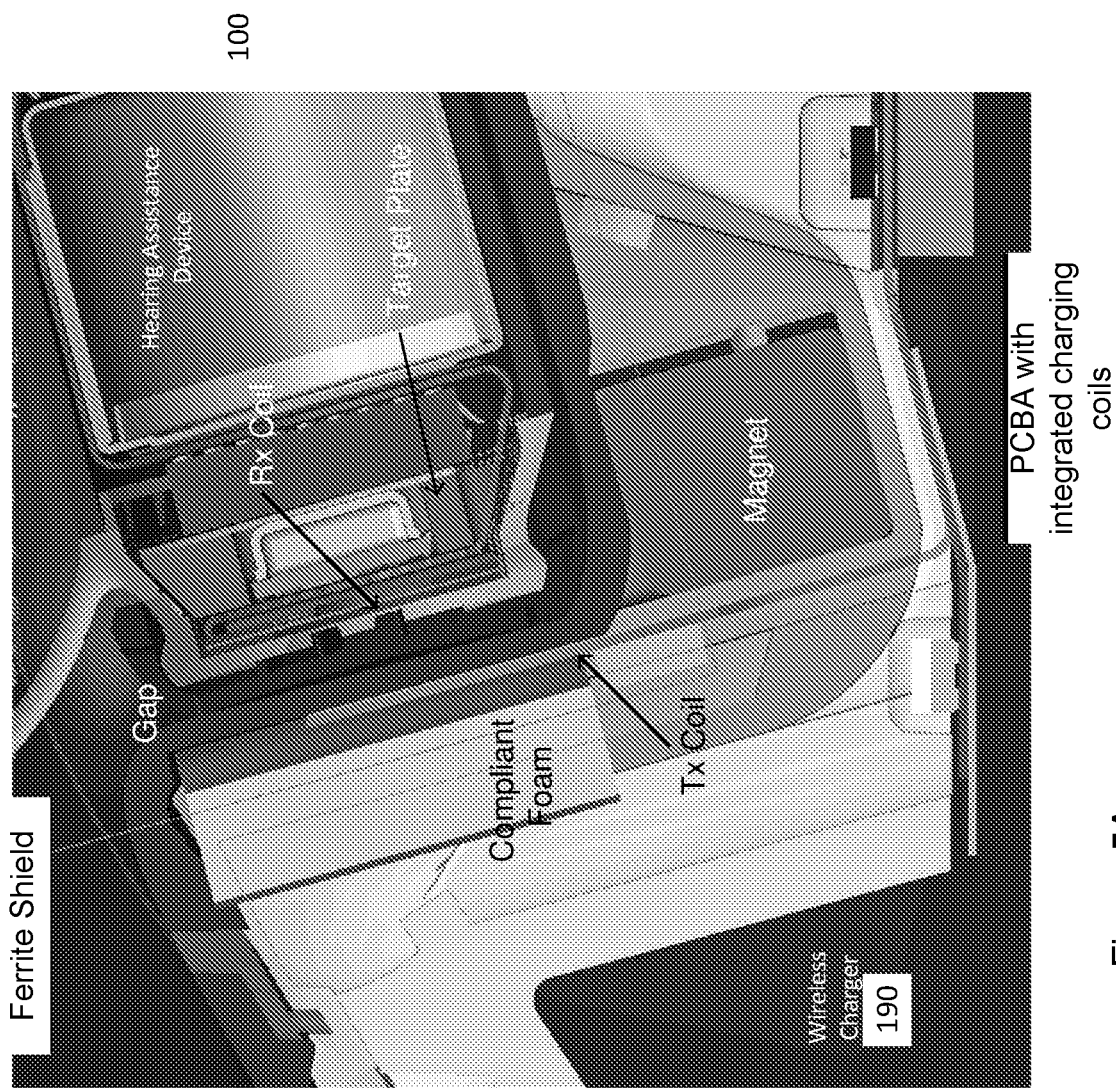
Figure 5B:
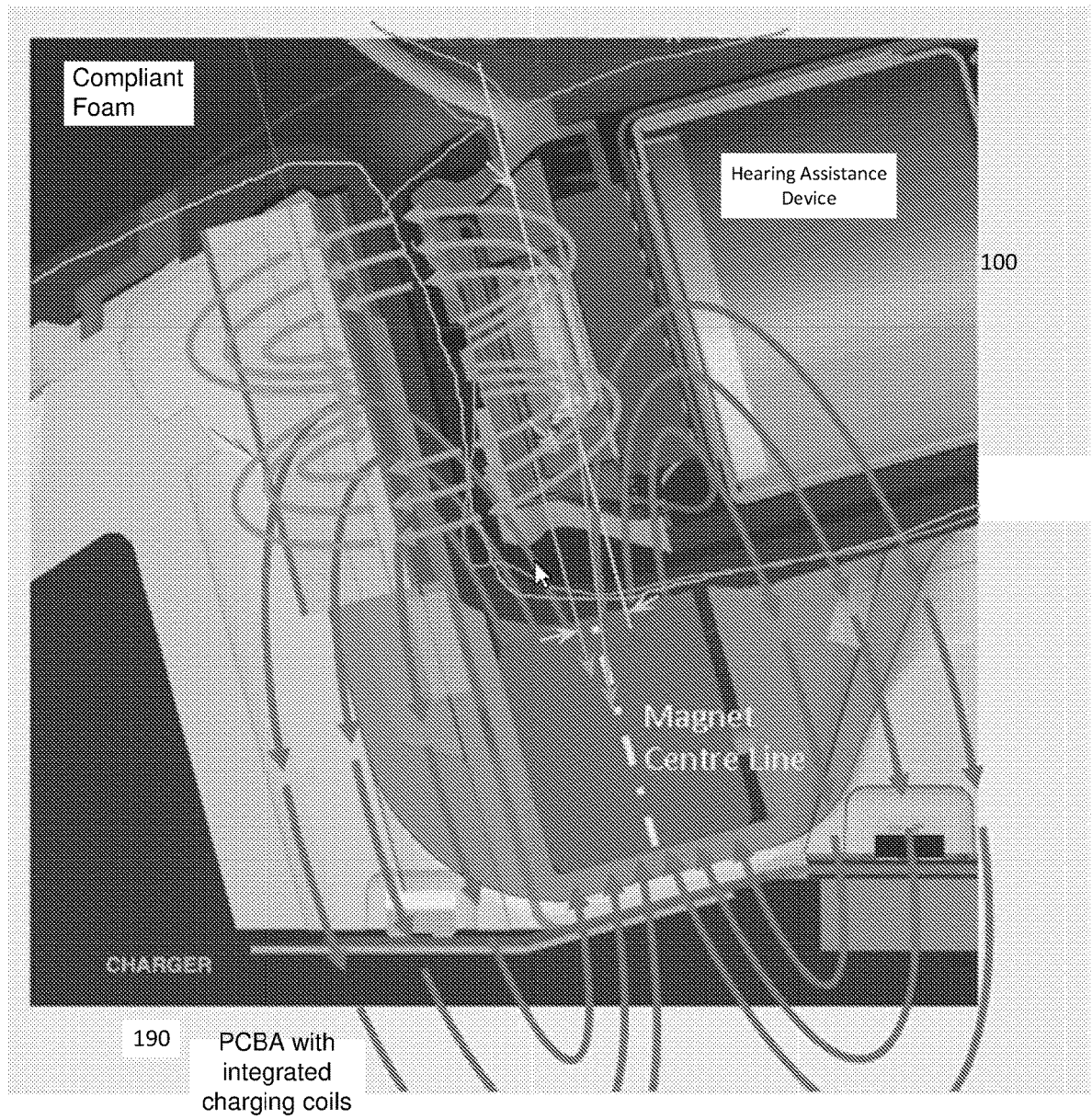

FIGS. 5A and 5B illustrate diagrams of an embodiment of an example distance of the gap between the transmit charge coil in the wireless charger and the receive charge coil in the hearing assistance device, which is controlled within the threshold amount by a few factors including integrating the transmit charging coil as part of a flexible printed circuit that is adhered to the compliant foam.

Figure 6:
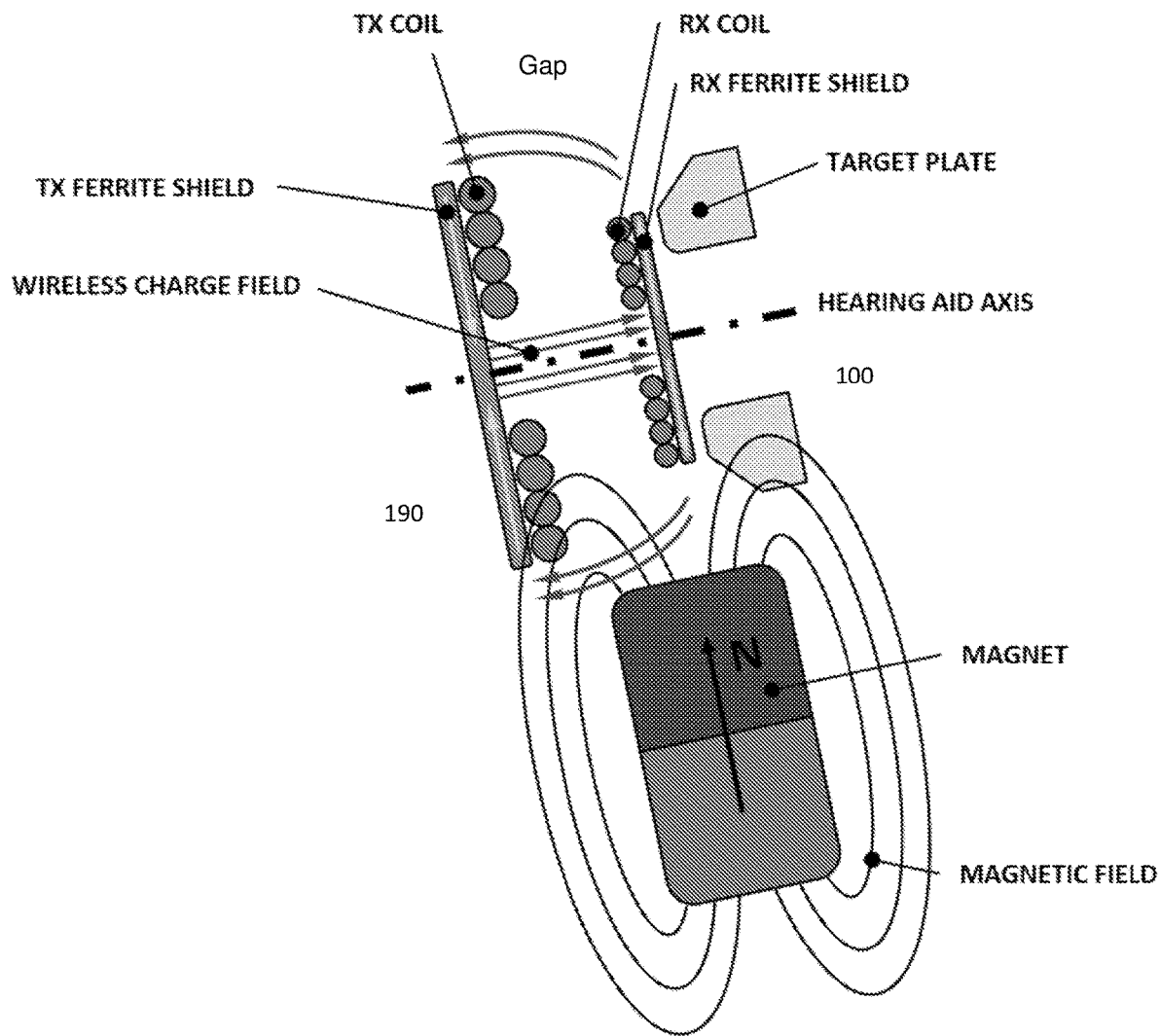

FIG. 6 illustrates a diagram of an embodiment of an example magnet in the wireless charger that is positioned relative to a transmit charge coil in the wireless charger and a receive charge coil in a hearing assistance device to control an amount of interference with a wireless charging occurring between the wireless charger and the hearing assistance device.

Figure 7:
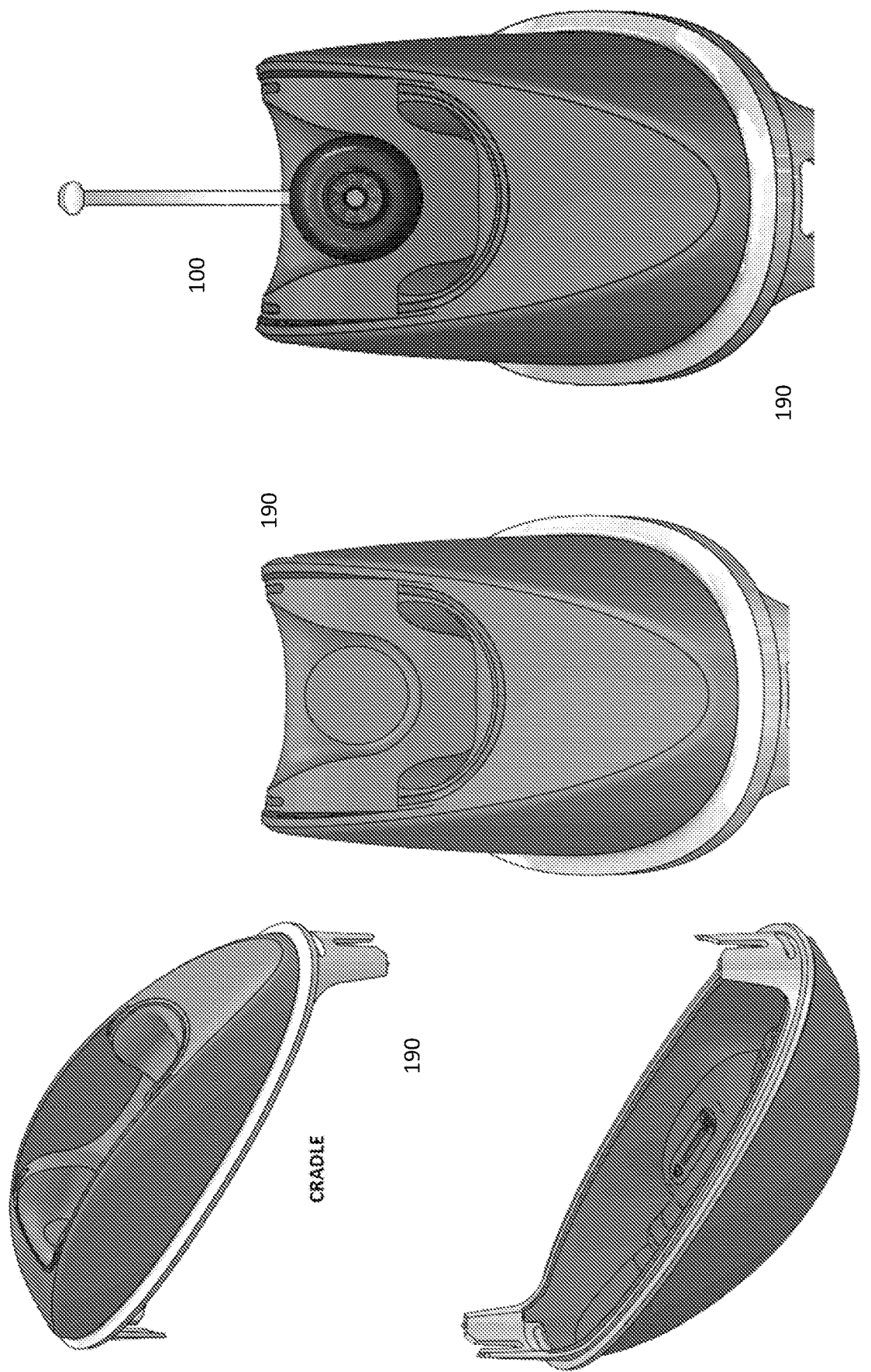

FIG. 7 illustrates a diagram of an embodiment of an example contours of the storage areas that conform to the shape of the hearing assistance device to enable an insertion and a retention of the hearing assistance device(s) correctly in the storage area(s) of the wireless charger as well as easy to physically remove the hearing assistance devices the storage area.

Figure 8:
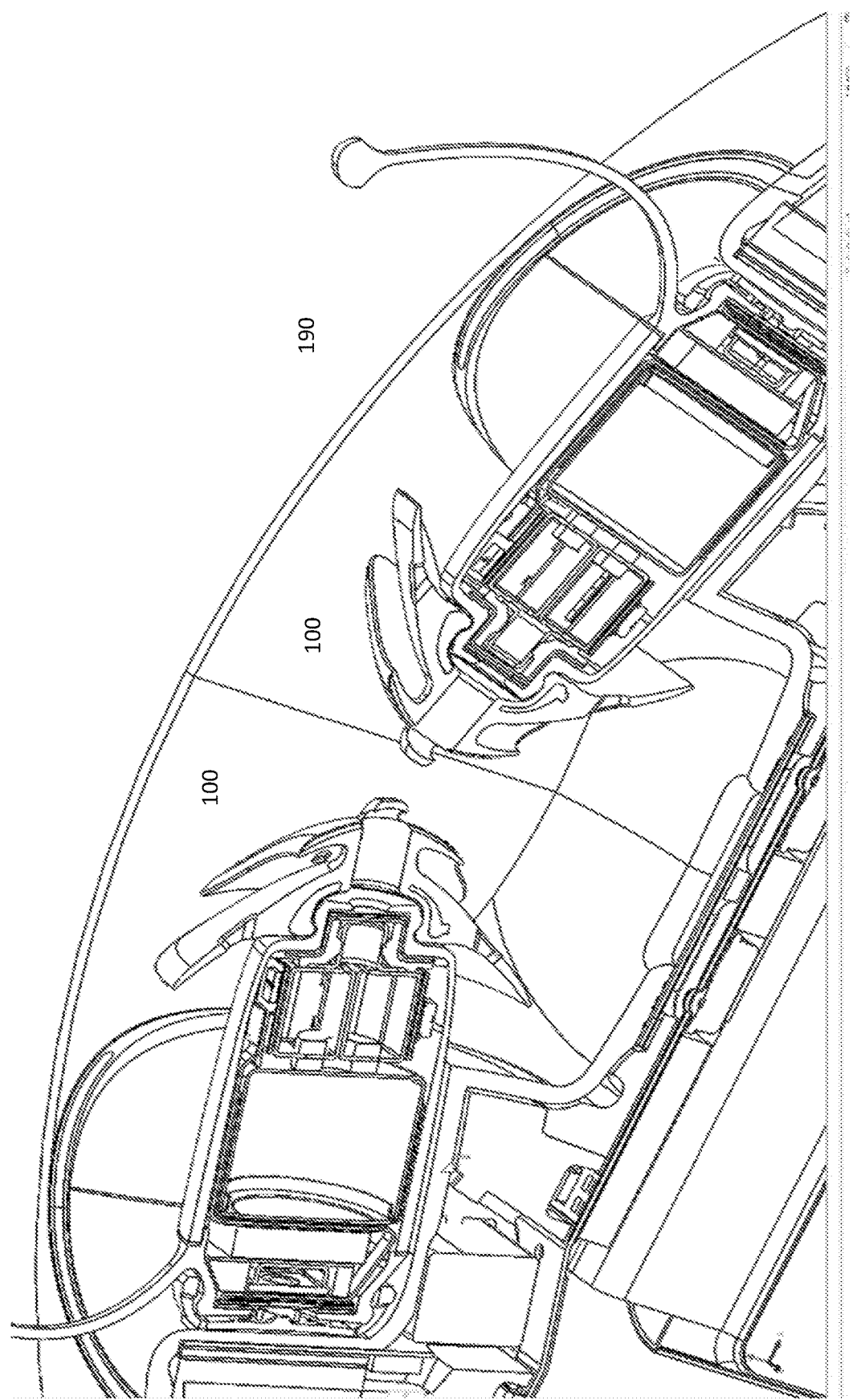

FIG. 8 illustrates a diagram of an embodiment of an example housing for the wireless charger that has a pair of storage areas to store the hearing assistance device in place when the hearing assistance devices are not in use, for example, when charging.

Figure 9:
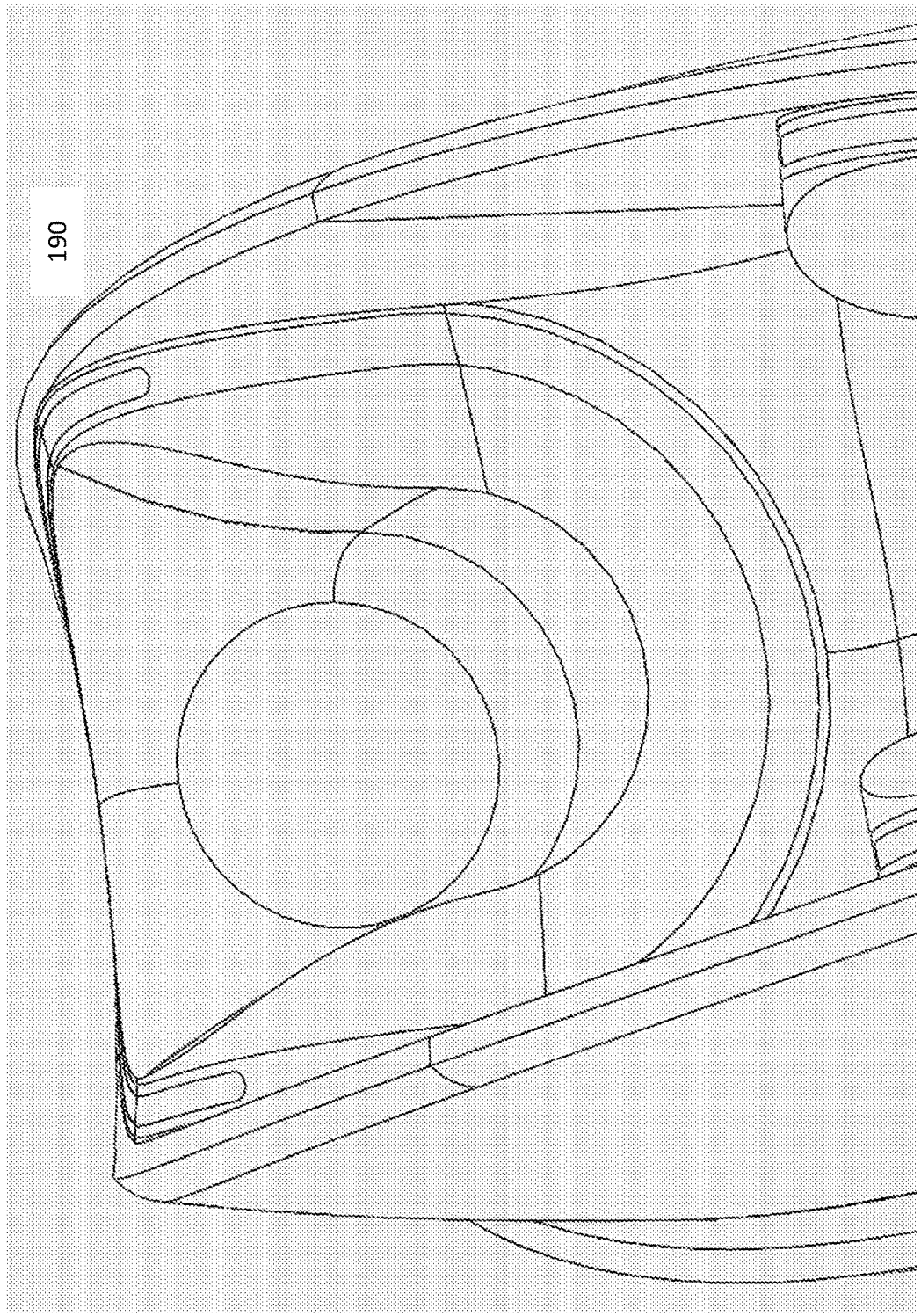

FIG. 9 illustrates a diagram of an embodiment of an example shape and slope of the housing of the wireless charger leading into the contours of the storage areas conforming to the shape of the hearing assistance device is configured to aid in repeatedly physically guiding the hearing assistance device into its proper location and alignment in the storage area.

Figure 10:
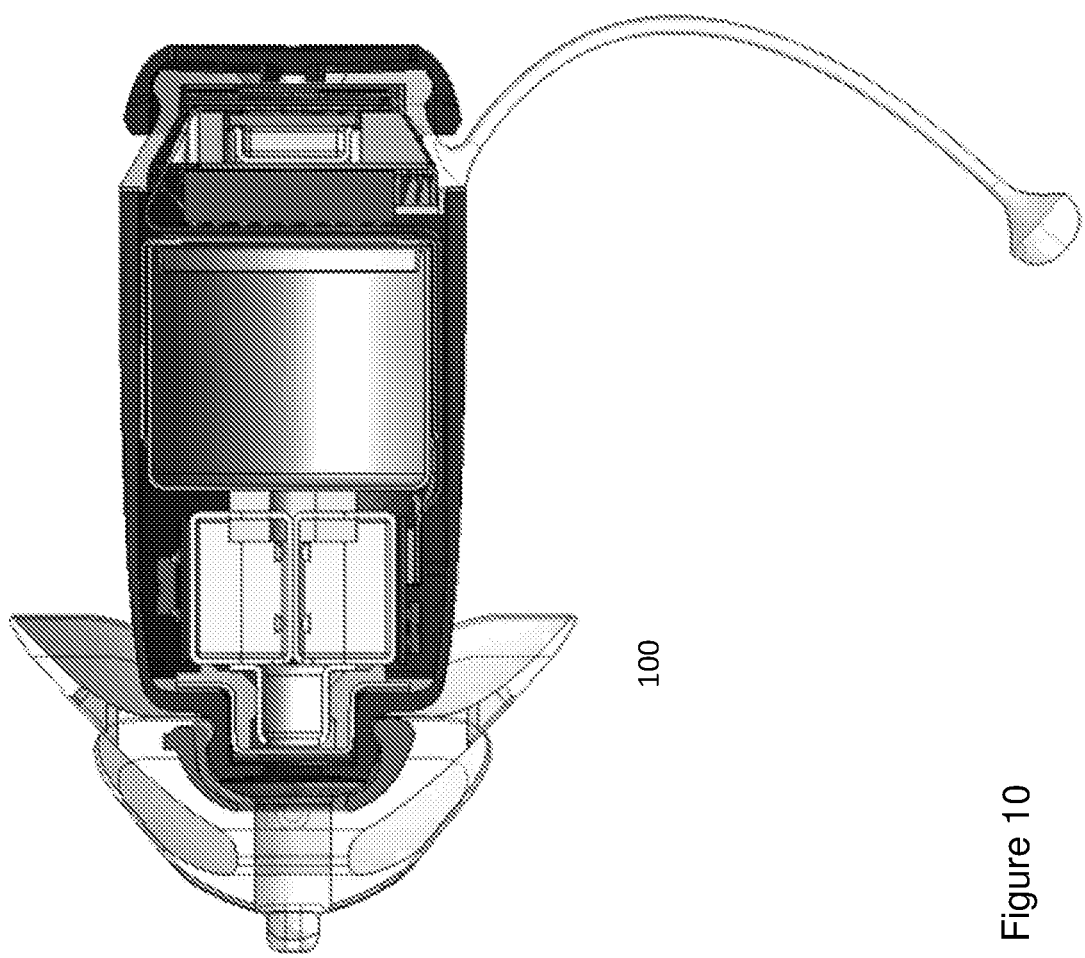
Figure 10:
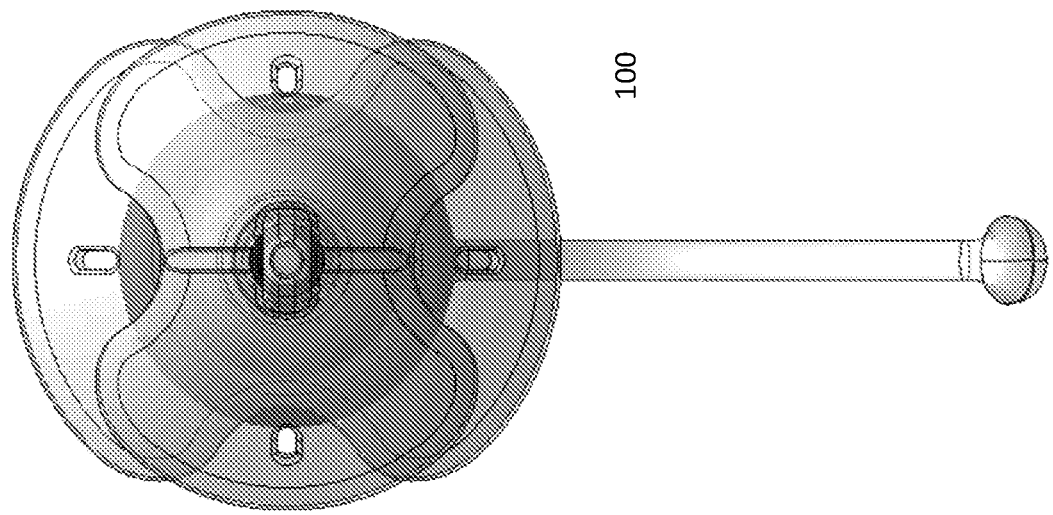

FIG. 10 illustrates an embodiment of an example front on view as well as a side diagram of an embodiment of an example hearing assistance device.

Figure 11:
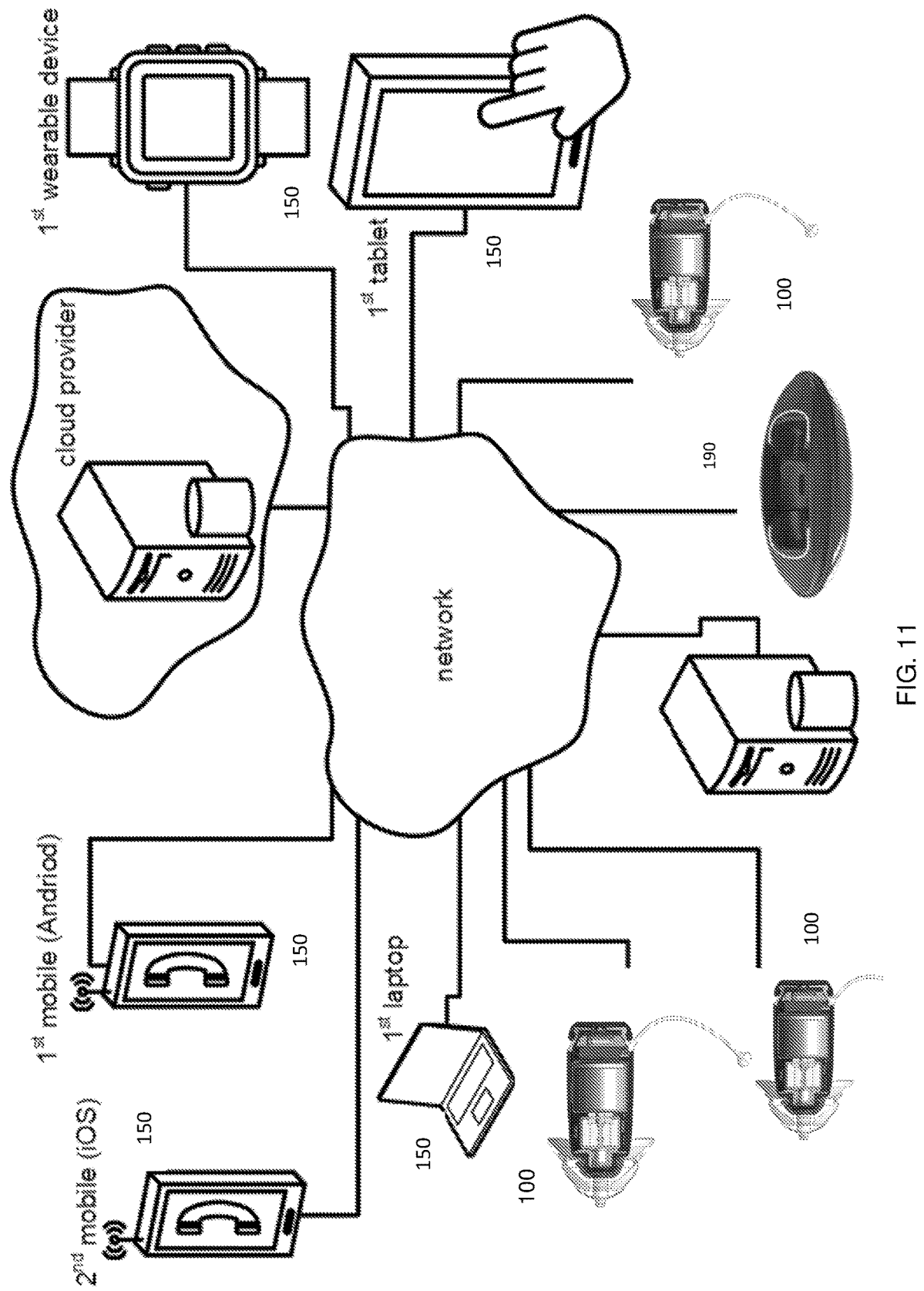

FIG. 11 illustrates a diagram of an embodiment of an example number of electronic systems, including the hearing assistance devices, communicating with each other in a network environment in accordance with some embodiments.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first hearing aid can be made. However, the specific numeric reference should not be interpreted as a literal sequential order but rather interpreted that the first hearing aid is different than a second hearing aid. Thus, the specific details set forth are merely exemplary. The specific details can be varied from and still be contemplated to be within the spirit and scope of the present design. The term coupled is defined as meaning connected either directly to the component or indirectly to the component through another component.

Figure 1:
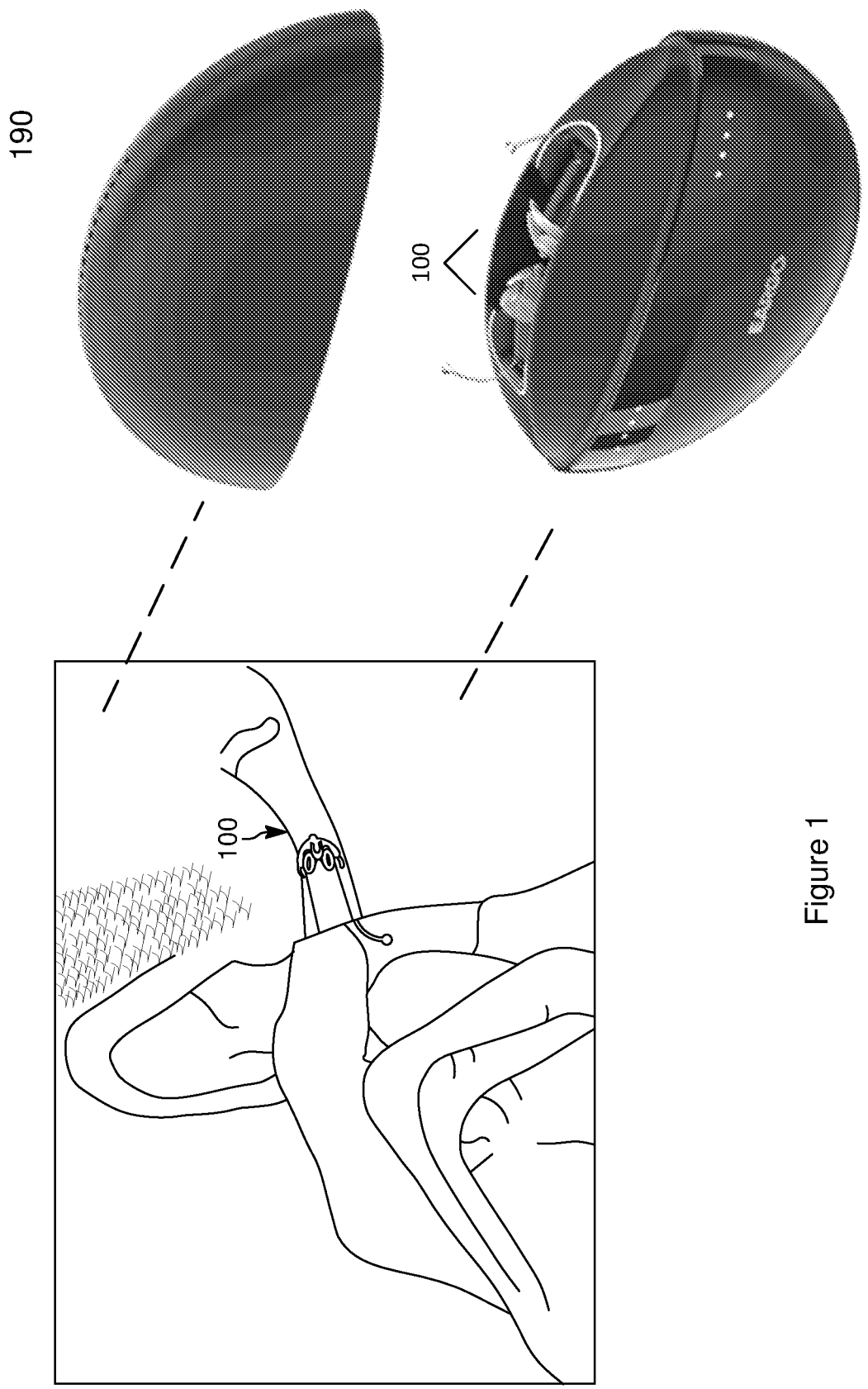
FIG. 1 illustrates a diagram of an embodiment of an example housing of the wireless charger that is used to store a pair of hearing assistance devices when the hearing assistance devices are not in use (including when they are being charged).

FIG. 1 illustrates a diagram of an embodiment of an example housing of the wireless charger that is used to store a pair of hearing assistance devices when the hearing assistance devices are not in use (including when they are being charged).

Magnetic retention is used between the wireless charger 190 and each hearing assistance device 100 in order to i) hold each hearing assistance device 100 in place when charging and/or storing, ii) and not interfere with the wireless charging occurring between the transmit charging coil of the wireless charger 190 and the receive coil in the hearing assistance device 100 too much, iii) while maintaining a small enough form factor to assemble an in-the-ear hearing assistance device 100 versus a behind-the-ear hearing aid (BTE). The wireless charger 190 is designed to provide an easy user experience when storing the hearing assistance devices 100 when not in use and be repeatedly manufacturable without a lot of defects due to tolerances.

The wireless charger 190 is shown with a pair of storage areas with the hearing assistance devices 100. Again, an example housing/case of the wireless charger 190 is used to store a pair of hearing assistance devices 100 when the hearing assistance devices 100 are not in use. The use of the magnet in the wireless charger 190 allows the wireless charger 190 to be a secure carrying case for the hearing assistance device 100. The use of the magnet holds the hearing assistance device in place in the portable carrying case/wireless charger 190 when the hearing assistance device 100 is put into its storage and charging location in the wireless charger's 190 housing. Even when the cap of the housing is accidentally knocked off the wireless charger 190, then the hearing assistance device 100 will not fall out because the magnet will supply a magnetic retention force to hold the hearing assistance device 100 in the carrying case.

As shown, the hearing assistance device 100 is configured to have dimensions that allow the hearing assistance device 100 to fit and be implemented as an in-the-ear-canal hearing aid and/or an ear bud. As shown, the example in-the-ear hearing assistance device 100 can be installed inside the ear of a user.

Figure 2:
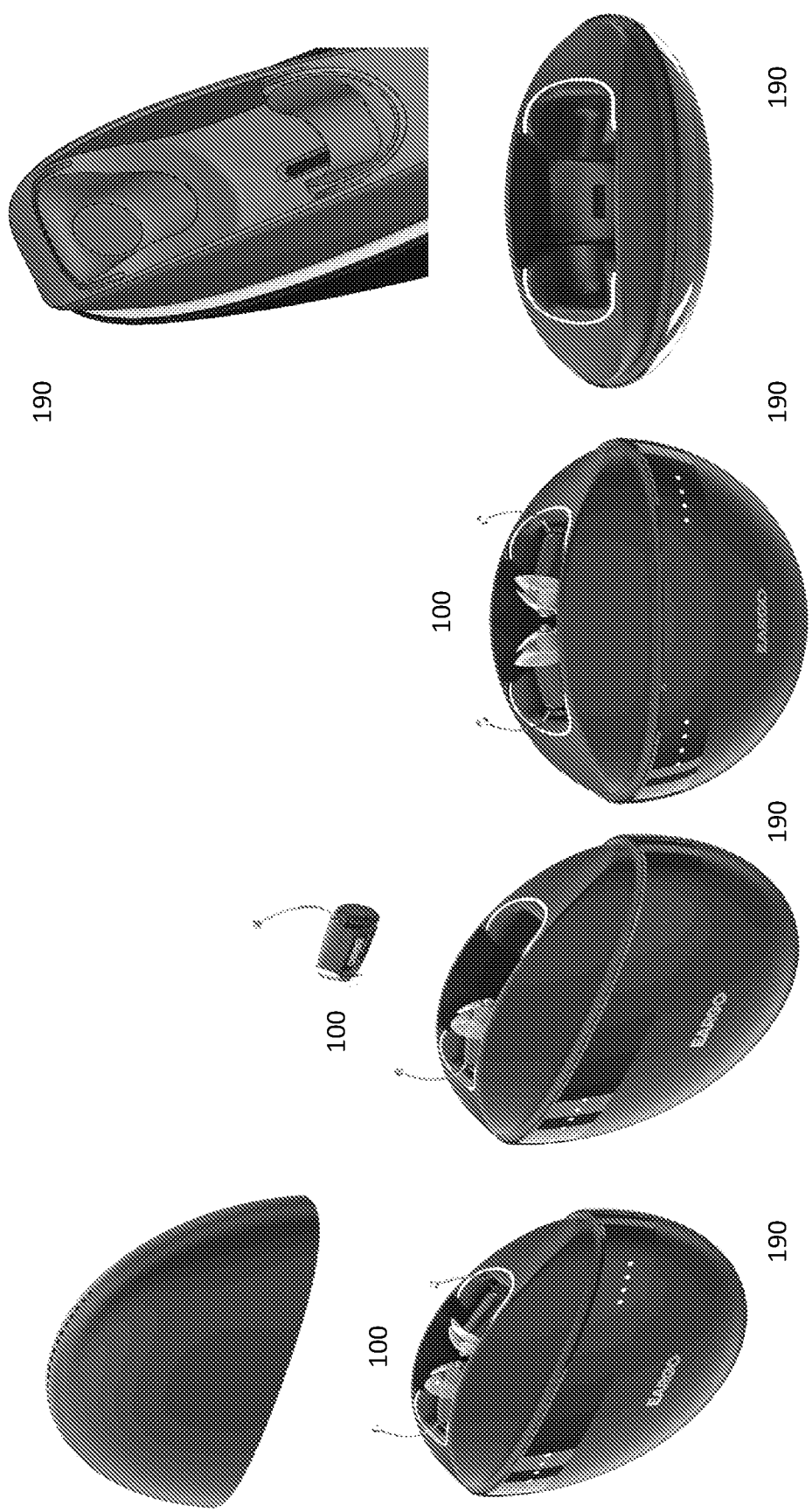
FIG. 2 illustrates multiple views of an embodiment of an example housing of the wireless charger that is used to store a pair of hearing assistance devices when the hearing assistance devices are not in use.

FIG. 2 illustrates multiple views of an embodiment of an example housing of the wireless charger that is used to store a pair of hearing assistance devices when the hearing assistance devices are not in use (which includes when the hearing assistance devices are being charged). The multiple views of the wireless charger 190 and its housing with the storage area for the hearing assistance devices 100 as well as the hearing assistance devices 100 differ from the top of the wireless charger removed on the left view to the top-down view of the example storage area in the wireless charger 190 shown on the right view.

The housing of the wireless charger 190 functions as a portable carrier case for the hearing assistance devices 100. The housing for the wireless charger 190 can have has one or more storage areas. The contours of the storage areas each conform to a shape of the hearing assistance device 100.

The shape and slope of the grooves of the molding of the plastic wireless charger 190 are shaped gradually to allow an easy lead in for an insertion of a hearing assistance device. The shape and slope of the contours/grooves are offset enough that the user need not have to fiddle too much and be exceedingly precise when trying to place the hearing assistance devices 100 into its storage area of the housing in the wireless charger 190.

The shape and slope of the grooves/contours of the wireless charger 190 make an insertion and a retention of the hearing assistance devices 100 into the storage area of the wireless charger 190 easy. The shape and slope of the grooves/contours of the wireless charger 190 make it easy to physically remove the hearing assistance devices 100 from the storage area. A human can pull the hearing assistance devices 100 out of the wireless charger 190 by overcoming a magnetic retention force. Yet, the hearing assistance devices 100 can have enough force from the magnetic retention force to not shake out of place in the wireless charger 190 when a user is transporting the hearing assistance devices 100 positioned properly/locked in place within the wireless charger 190.

FIG. 3 illustrates a diagram of an embodiment of an example magnet in the wireless charger and a ferromagnetic target plate in a hearing assistance device that are used to create a magnetic retention force to hold each hearing assistance device in place when charging in order to control an amount of interference with a wireless charging between the wireless charger and the hearing assistance device(s).

As shown, the magnet in the wireless charger 190 and the ferromagnetic target plate in each hearing assistance device create a magnetic retention force that holds the hearing assistance device 100 in place when charging.

The magnetic field of the magnet is offset relative to the target plate or the receive charge coil in the hearing assistance device 100 so that the primary force of the magnetic field is pulling down on the hearing assistance device 100 to put the hearing assistance device 100 into a known specific location and an offset enough to slightly pull the hearing assistance device 100 backwards and downwards to make a direct contact between the wall of the hearing assistance device 100 in the wall of the wireless charger 190.

As shown, on a lower left is a wireless charger 190 with two hearing assistance devices 100 stored inside. Up to the right, a magnification of one of the hearing assistance devices 100 located inside of the hearing of the wireless charger 190 is shown. The hearing assistance device 100 rests in its storage location inside the wireless charger 190 where the contours of the shaped area of the housing guide and help retain the hearing assistance device 100 in an optimum wireless charging alignment. The hearing assistance device 100 can have its receive charging coil, its target plate, and its ferrite shield in an optimum wireless charging alignment with the wireless charger 190. There is a gap between the hearing assistance device 100 and the transmit charging coil of the wireless charger 190. As shown, the transmit charging coil and its printed circuit board connects to the foam inside the housing.

As discussed, the wireless charger 190 uses a magnetic retention force; and accordingly, the magnetic in the wireless charger 190 is positioned relative to a transmit charging coil in the wireless charger 190 and a receive coil in a hearing assistance device 100 such that the magnetic field supplied from the magnet to cause the desired magnetic retention force to retain the hearing assistance device 100 is not going to interfere significantly with the magnetic fields intended to cause the wireless charging between transmit charging coil in the wireless charger 190 and a receive coil in a hearing assistance device 100 during the charging of the batteries in the hearing assistance device and/or communication of data.

Again, the magnet is positioned relative to the transmit and receive charge coils. The magnet is positioned to 1) the side or 2) below the transmit charge coil in the wireless charger 190 and the receive charge coil in the hearing assistance device 100. The magnet is positioned so that its magnetic waves will have a minimal impact on the charging coils and charging magnetic fields causing the wireless charging of the batteries in the hearing assistance device 100. Accordingly, the magnet is polarized and has a magnetic strength set to cause a minimal impact on the magnetic fields caused by the charging coils in addition to its geographic positioning. The magnet's primary function is to pull in and hold the hearing assistance device 100 in its charge location and alignment between the transmit charge coil in the wireless charger 190 and the receive coil in the hearing instrument.

The magnetic field of the magnet is offset relative to the target plate or charge coil in the hearing assistance device 100 so that the primary force of the magnetic field is pulling down on the hearing assistance device 100 to put the hearing assistance device 100 into a known specific location and an offset enough to slightly pull the hearing assistance device 100 backwards and downwards to make a direct contact between the wall of the hearing assistance device 100 in the wall of the wireless charger 190. This is a slight offset of less than normally 1 mm. The magnet pulls it towards the seat and at a small angle relative to the gap. The magnet pulls hearing assistance device 100 towards the circular seat and adds aids to maintain a small angle relative to the gap for the receive coil in the hearing assistance device 100. In an embodiment, the hearing assistance device 100 is retained in accurate positioning for wireless charging by, for example, a fully saturated N52 magnet. The N52 magnet is an example of the highest grade of neodymium magnet currently available with a strength of the magnetic fields of up to 1.4 teslas. The magnet is polarized on its side facing towards the hearing device.

The hearing assistance device 100 contains a ferromagnetic material ("target plate") with an approximately evenly distributed mass about the hearing assistance device's 100 axis, such that regardless of the hearing assistance device 100 rotation about its axis, it will be attracted to the magnet at the same location. Some examples of ferromagnetic substances are Iron, Cobalt, Nickel, etc. Note, a difference between the magnetic and the ferromagnetic target plate is the target plate tries to adhere itself to the magnet which is magnetized.

The target plate can be located such that the center of mass is located offset from the magnet centerline such that the magnet is applying a force on the hearing assistance device 100 along its axis to ensure it is located firmly against the plastic component on which hearing assistance devices 100 rest in the wireless charger 190 ("cradle").

FIG. 4 illustrates a diagram of an embodiment of an example wireless charger housing that contains a transmit charging coil and a magnet. The housing is shown as translucent around the transmit charging coil, magnet, compliant foam, and ferrite shield. Up to the right, the assembly of the transmit charging coil integrated into its flexible printed circuit board, compliant foam, and ferrite shield is shown.

Again, the isolation view of the assembly of printed circuit board integrated charging coils, the compliant foam, and the ferrite shield is shown in position mounted inside the housing of the wireless charger 190. The contours of the molding of the housing are shaped to cause the hearing assistance device 100 to naturally fall within the contours of that housing and align with the transmit charge coil. Thus, the shape and slope of the storage location in the wireless charger 190 aids in repeatedly getting the hearing assistance device 100 into its proper location and alignment to allow an efficient charge of the batteries of the hearing assistance device. The shape of the storage location for the hearing assistance device 100 is shaped and sloped closer to a V (as opposed to a perfect cylinder) so that the hearing assistance device 100 naturally centers itself in the location for the storage and be in the correct position for aligning the wireless charging. Again, the contours of the storage area lead to an area of the housing that has a flat circular portion, which has dimensions slightly larger than the corresponding circular back of the hearing assistance device 100, and the transmit charging coil is located at this flat circular portion.

Next, the magnet within the housing has two peaks that act as magnetic concentrators. This allows for increased and more accurate retention of the hearing assistance device 100 closer to the peaks compared to other magnet shapes, such as a half-pipe-style shape. The increased magnetic retention ensures the hearing assistance device 100 requires a solid removal force and will not fall out of the wireless charger 190 from minor impacts, such as an accidental bump.

FIGS. 5A and 5B illustrate diagrams of an embodiment of an example distance of the gap between the transmit charge coil in the wireless charger and the receive charge coil in the hearing assistance device, which is controlled within the threshold amount by a few factors including integrating the transmit charging coil as part of a flexible printed circuit that is adhered to the compliant foam. Both FIG. 5A and FIG. 5B show a zoomed-in view between 1) the printed circuit board, the compliant foam, the ferrite shield on the backside of the transmit charging coil, and the magnet in the wireless charger 190 and 2) the ferrite shield on the backside of the receive coil and target plate in the hearing assistance device 100, as well as the gap that is between the receive coil and the transmit coil when the hearing assistance device 100 is stored inside the housing of the wireless charger 190 and in place. FIG. 5B shows the same zoomed-in relationship between the hearing assistance device 100 resting in the storage area of the wireless charger 190 but superimposed are the magnetic fields from the magnet inside the wireless charger 190 as well as the magnetic fields between the transmit charge coil and the receive coil in order to send power wirelessly to the hearing assistance device 100. The magnetic fields generated by the magnet are offset in regard to the magnetic fields being generated by the wireless charging through the coils.

The magnet in the wireless charger 190 and the ferromagnetic target plate in each hearing assistance device 100 are positioned relative to a charging coil in the wireless charger 190 and a receive coil in the hearing assistance device 100 such that a first magnetic field supplied from the magnet to cause the magnetic retention force of the hearing assistance device 100 to be controlled to not significantly interfere with a second set of magnetic fields causing the wireless charging between the charging coil in the wireless charger 190 and the receive coil in a hearing assistance device 100.

Note, magnetic fields going in the same direction of each other will significantly interfere with each other (e.g., subtract from each other). Thus, the magnet is used to retain the hearing assistance device 100 oriented perpendicular to the wireless charging axis so that the magnetic field it generates is perpendicular to the wireless charging axis. This significantly reduces interference between the magnetic fields generated by both the magnet and the wireless charging coils allowing for more efficient charging.

The perpendicular orientation of the magnet's magnetic field allows for the ability to use a stronger magnet, such as the N52, which ends up producing less interference and less impact on the efficiency of the wireless charging. The reduced interference and impact to the wireless charging efficiency allows for the wireless charging coils to be packaged closer to the perpendicular magnet allowing for a smaller form factor for the hearing assistance device 100 while still maintaining the same existing features as an in-the-ear canal hearing assistance device. A smaller form factor allows for the inclusion of more people within the market by enabling people with smaller inner ear canals to use the hearing assistance devices 100.

Next, the ferromagnetic target plate is located within the hearing assistance device 100 such that a center of mass is located offset from a magnet centerline. The offset between the center of mass of the ferromagnetic target plate and the centerline of the magnet is configured to create a force vector pulling the hearing assistance device 100 downward into the housing (e.g., cradle) and due to the contour shape of the storage area backwards towards the transmit charging coil, so that the hearing assistance device 100 abuts firmly [e.g., fully bottoms out] against the housing of the wireless charger 190 at a location of the charging coil every time. Again, the magnet's primary function is to pull the hearing assistance device 100 into its charge location and alignment between the transmit charge coil in the wireless charger 190 and the receive coil in the hearing instrument.

Next, a distance/size of the gap between the transmit charge coil in the wireless charger 190 and the receive charge coil in the hearing instrument is controlled within a threshold amount (kept to a minimum) by at least three factors. The distance of the gap is controlled to be 0.02 millimeters up to 1.5 mm. In an example embodiment, the gap is controlled to be 1.04 mm + or −0.02 millimeters. The minimum gap would have the copper coils of each charging coil face to face with a thin hermetic seal between the two (e.g., the receiving coil in the hearing assistance device 100 and the charging coils in the wireless charger 190.)

A first factor is controlling a thickness of a casing in a hearing assistance device 100 in an area covering the receive coils in the hearing assistance device 100 as well as controlling a thickness of a housing in a wireless charger 190 in an area covering the transmit coils. The thickness can be controlled by a choice of a fluid flowing (e.g., not viscous/low viscosity) plastic so that the plastic can flow easily into the mold for the hearing assistant device and the mold for the wireless charger 190 with very little resistance; and thus, be able to be made reliably thin. Example plastic may be a Polycarbonate (PC)-Polybutylene Terephthalate (PBT) plastic. The hearing instrument may use a nylon for the microphone cover.

The second factor to keep the gap small is the use of foam and the fact that the form is made out of a compliant material. The distance/size of the gap between a transmit charge coil in the wireless charger 190 and a receive charge coil in the hearing instrument is controlled within a threshold amount by the use of foam that is made out of the compliant material. A directional force applied by the compressed compliant foam forces the transmit charge coil to be pressed flat and evenly against a wall of the housing for the wireless charger 190. The form is made out of a compliant material so that when it's being assembled the foam can compress and push the transmit charge coil to be pressed directly against the wall of the plastic making the casing for the wireless charger 190. This directional force applied by the compressed compliant foam forces the wireless transmitter coil to be pressed flat and evenly against the wall of the plastic molding for the wireless charger 190. The upward bias of the foam combined with the offset between the center of mass of the target plates and the centerline of the magnet allows for the ability to maintain gap distances between coils with higher accuracy.

Note, also the use of the foam made out of a compliant material that is compressible also allows for manufacturing tolerances to be slightly relaxed because of the compressible nature of their form and can adapt its shape when other components have not been assembled perfectly in line and in their exact position during the manufacturing process. This allows greater tolerances during the manufacturing process. Note the foam made out of the compliant material could be replaced with a glue to hold the wireless transmit coil in place but could lose some of the benefits listed above as well as would no longer be easily disassembled. For example, foam allows the easy disassembly and assembly of the wireless charger 190, which allows for more repairs.

The third factor in keeping the gap as well as a form factor of each device's overall dimensions small is integrating the wireless transmitter coil to the printed circuit board inside the wireless charger 190. The distance of the gap between the transmit charge coil in the wireless charger 190 and the receive charge coil in the hearing instrument is also controlled within the threshold amount by integrating the transmit charging coils as part of a flexible printed circuit that is adhered to the compliant foam. Smaller dimensions are possible by integrating the transmit charging coils as part of a flexible printed circuit and this makes an overall area taken up between the wireless transmitter coil and the printed circuit board smaller and dimensions, than if the wireless transmitter charging coil is a separate and distinct component from the printed circuit board. Again, then, the wireless charging coils in the wireless charger 190 integrated as part of a flexible printed circuit is adhered to the compliant foam and inserted into the housing. The system can also use wire wound coils, but these would increase cost and require larger physical packages, but would cause slight wireless charging improvements.

The foam and wireless charging coils sit more upward and outward interfering with the cradle in two directions. When the foam and wireless charging coil are installed into the cradle, the foam is compressed in order to fit the foam and wireless charging coils into the cradle creating an upward bias. The upward bias of the foam forces the wireless charging coils against the portion of the housing/cradle that contacts the hearing assistance device 100 on the opposite side without the need for any adhesives between the transmit charging coils and the housing itself allowing for a closer distance between the transmit and receive charging coils.

Utilizing the upward bias of the foam instead of an adhesive to secure contact between the wireless charging coils and the housing/cradle reduces the impact caused by variations in components resulting from tolerances during manufacturing. This improves the efficiency and optimization for the manufacturing of the components and reduces the need to rework or tune the components in order to get them to fit together.

In wireless charging, as the gap distance increases, there are massive drops in efficiency. As such, the wireless charging coils of the wireless charger 190 are positioned as close as possible to the wall of the housing contact point of the cradle where the wireless charging coils of the hearing assistance device. By removing the need for an adhesive layer to join the wireless charging coil to the cradle, the gap distance between the wireless charging coils is reduced improving efficiency in wireless charging.

Next, as discussed, FIG. 5A shows both the hearing assistance device 100 and the wireless charger 190 have a shield made out of ferrite material. A transmit charging coil in the wireless charger 190 and a receive charging coil in hearing assistance device 100 have the shield made out of ferrite material on i) a backside of the transmit charging coil as opposed to a front side that faces the receive charging coil and ii) a backside of the receive charging coil as opposed to a front side that faces the transmit charging coil.

FIG. 6 illustrates a diagram of an embodiment of an example magnet in the wireless charger that is positioned relative to a transmit charge coil in the wireless charger and a receive charge coil in a hearing assistance device to control an amount of interference with a wireless charging occurring between the wireless charger and the hearing assistance device. As shown, a similar relationship of components exists as discussed in FIGS. 5A and 5B, but without the housing of the wireless charger 190 or the casing of the hearing assistance device 100. The transmit charging coil is shown facing the received charging coil in the hearing assistance device 100. A ferrite shield is on both the receive side and the transmit side in order to concentrate the flux of the magnetic field and control where that magnetic field is going during the charging. The lines of the magnetic fields for the wireless charge signal are transmitted from the charging coil and go towards and into the receive coil. The lines of the magnetic fields for the wireless charge signal then loop back. Also, the target plate cooperates with the magnet in the wireless charger 190 to pull the target plate in response to the magnetic field from the magnet to pull the hearing assistance device 100 into position.

The magnet in the wireless charger 190 is positioned relative to a transmit charge coil in the wireless charger 190 and a receive charge coil in a hearing assistance device 100 to control an amount of interference with a wireless charging between the wireless charger 190 and the hearing assistance device. The magnet is positioned at least one of i) to a side of the transmit charging coil in the wireless charger 190 and the receive charge coil in the hearing assistance device, ii) to below the transmit charging coil in the wireless charger 190 and the receive coil in the hearing assistance device 100, and iii) not in between the transmit charging coil and receive coils.

Next, the mass of the target plate has a square hole cutout in the middle of the target plate in order to be able to package the microphone within. This maximizes the amount of mass that may fit into the hearing assistance device 100 without hitting tolerance constraints.

Next, the wireless charging coils include wireless charging transmitting coils on the wireless charger 190 side which are larger copper coils (e.g., 5 mm diameter coil) and wireless charging receiving coils on the hearing assistance device 100 side which are smaller copper coils (e.g., 3 mm diameter coil). The wireless charging coils on the transmission side are larger in order to ensure the transfer of charge emitted hits the receiving coils completely.

Next, the wireless charging coils (both transmit and receive) each have a ferritic material applied to the rear sides of them to reduce wasted energy from the wireless charging and to assist them with shielding from surrounding magnetic fields and ferromagnetic materials. The ferritic material from the transmitting side on the wireless charger 190 should not be saturated in order to retain some of the magnetic field generated by the wireless charging coils so that it may be passed through to the ferritic material on the receiving side in the hearing assistance device. When the ferritic material is saturated, power will no longer be able to transfer through and will merely generate heat. Both the hearing instrument and the wireless charger 190 use a ferrite shield in order to concentrate the flux and make a more efficient charging between the hearing assistance device 100 and a wireless charger 190.

FIG. 7 illustrates a diagram of an embodiment of an example contours of the storage areas that conform to the shape of the hearing assistance device to enable an insertion and a retention of the hearing assistance device(s) correctly in the storage area(s) of the wireless charger as well as easy to physically remove the hearing assistance devices the storage area. FIG. 7 shows three views of the wireless charger 190. One view shows a top portion containing the storage area of the wireless charger 190 (e.g., the cradle) where the hearing assistance devices will eventually be stored separated from the lower portion of the wireless charger 190 which has the additional components. A middle view shows a straight on view of a flat circular area of the wireless charger 190 in the storage area and the contours and the slight V slope into the storage area. A view on the right shows a wireless hearing assistance device 100 installed and stored in the storage area of the wireless charger 190. The contours of the storage areas each conform to the shape of the hearing assistance device 100 to enable an insertion and a retention of the hearing assistance devices correctly in the storage areas of the wireless charger 190. The contours of the storage areas allow easy physical removal of the hearing assistance devices from the storage area, via a human pulling the hearing assistance devices out of the wireless charger 190. The human needs to overcome a strength of the magnetic retention force between the ferromagnetic target plate in the hearing assistance devices and the magnet in the wireless charger 190. The strength of the magnetic retention force between the ferromagnetic target plate in the hearing assistance devices and the magnet in the wireless charger 190 is set below well below an average amount of force a human can produce to pull out the hearing assistance device 100 but slightly above a force needed for the hearing assistance devices to shake out of place in the wireless charger 190 when a user is transporting the hearing assistance devices.

The view on the right shows the magnet in the wireless charger 190 and the ferromagnetic target plate in the hearing assistance device 100 cooperate with the contours of the storage areas that conform to the shape of the hearing assistance device 100 to magnetically pull the hearing assistance device 100 into its charge location and alignment between a transmit charge coil in the wireless charger 190 and a receive coil in the hearing instrument. The hearing assistance device 100 is aligned properly. A shape and slope of the storage location, in the wireless charger 190, leading into the contours of the storage areas conforming to the shape of the hearing assistance device 100 is configured to aid in repeatedly physically guiding the hearing assistance device 100 into its proper location and alignment in the storage area conforming to the shape of the hearing assistance device 100 to allow an efficient charge of the batteries of the hearing assistance device. The shape leading into the contours of the storage in the shape of the hearing assistance device 100 the storage location for the hearing assistance device 100 is shaped and sloped closer to a V (as opposed to a perfect cylinder) so that the hearing assistance device 100 naturally centers itself in the location for the storage and be in the correct position for aligning the wireless charging. In the storage area conforming to the shape of the hearing assistance device, a small amount of clearance space exists to the sides of the hearing assistance device 100 to make sure it is slightly wide enough on the sides to allow a bottom of the hearing assistance device 100 to contact the front bottom of the storage area formed by the housing of the wireless charger 190.

FIG. 8 illustrates a diagram of an embodiment of an example housing for the wireless charger that has a pair of storage areas to store the hearing assistance device in place when the hearing assistance devices are not in use, for example, when charging. FIG. 8 shows a pair of hearing assistance devices being stored inside the wireless charger 190 in their proper positions for the most efficient wireless charging to occur to recharge the batteries inside each hearing assistance device.

FIG. 9 illustrates a diagram of an embodiment of an example shape and slope of the housing of the wireless charger leading into the contours of the storage areas conforming to the shape of the hearing assistance device is configured to aid in repeatedly physically guiding the hearing assistance device into its proper location and alignment in the storage area. FIG. 9 shows the storage area built into the housing of the wireless charger 190 with a large circular area that mates up to the circular area of the hearing assistance device 100 as well as the example contours of the wireless charger 190 that conform to a shape of a hearing assistance device.

The shape and contours of the storage areas (e.g., cradle) are designed such that the hearing assistance device, when pulled down by the magnet and backwards into the cradle, the hearing assistance device 100 will locate and align with the wireless charging coils via the offset between the center of mass of the target plate and the centerline of the magnet. Without the offset between the center of mass of the target plates and the centerline of the magnet, the hearing assistance device 100 would be held and retained by the magnet, but unable to locate the wireless charging as it would not be pulled into the appropriate position.

FIG. 10 illustrates an embodiment of an example front on view as well as a side diagram of an embodiment of an example hearing assistance device. The side view is good to illustrate the hearing assistance device does not have an external electrical contact to transfer data. Wax build up on an external contact on a hearing assistance device can interfere with data transmission through the electrical contact. The hearing assistance device can be made without the external electrical contact on the hearing assistance device. Thus, the wireless transfer of both power and data communications occurs between the wireless charger and the hearing assistance device.

In general, two ways exist to charge the batteries in the hearing assistance device. One is a direct contact with an electrical contact on an external surface of the hearing assistance device that then goes to the battery. The other way of charging is the use of a wireless receive coil in the hearing assistance device. Elimination of the electrical contact removes the degradation from earwax as well as galvanic corrosion occurring to other parts in both the hearing assistance device and the wireless charger.

A lack of an external contact also allows a hermetic ceiling of the wireless charger.

FIG. 11 illustrates a diagram of an embodiment of an example number of electronic systems, including the hearing assistance devices, communicating with each other in a network environment in accordance with some embodiments. The hearing assistance devices 100 as well as the wireless charger 190 can cooperate other components in those devices hosting an application to communicate and control the hearing assistance devices 100 in the network. Any two of the number of electronic devices can be the computationally poor target system and the computationally rich primary system of the distributed speech-training system. The network environment has a communications network. The network can include one or more networks selected from a body area network ("BAN"), a wireless body area network ("WBAN"), a personal area network ("PAN"), a wireless personal area network ("WPAN"), an ultrasound network ("USN"), an optical network, a cellular network, the Internet, a Local Area Network (LAN), a Wide Area Network (WAN), a satellite network, a fiber network, a cable network, or a combination thereof. In some embodiments, the communications network is the BAN, WBAN, PAN, WPAN, or USN. As shown, there can be many server computing systems and many client computing systems connected to each other via the communications network. However, it should be appreciated that, for example, a single server computing system such the primary system can also be unilaterally or bilaterally connected to a single client computing system such as the target system in the distributed speech-training system. As such, FIG. 5 illustrates any combination of server computing systems and client computing systems connected to each other via the communications network.

The wireless interface of the target system can include hardware, software, or a combination thereof for communication via Bluetooth®, Bluetooth® low energy or Bluetooth® SMART, Zigbee, UWB or any other means of wireless communications such as optical, audio or ultrasound.

The communications network can connect one or more server computing systems selected from at least a first server computing system and a second server computing system to each other and to at least one or more client computing systems as well. The server computing systems and can respectively optionally include organized data structures such as databases. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device (e.g., smartphone with an Android-based operating system) with the application 150, a second mobile computing device (e.g., smartphone with an iOS-based operating system) with the application 150, a first wearable electronic device (e.g., a smartwatch) with the application 150, a first portable computer (e.g., laptop computer) with the application 150, a third mobile computing device or second portable computer (e.g., tablet with an Android- or iOS-based operating system) with the application 150, and hearing assistance devices 100, a wireless charger 190, and the like. Each of the one or more client computing systems can have one or more firewalls to protect data integrity. The wireless charger 190 communicates and cooperates with the hearing assistance devices 100.

Any one or more of the server computing systems can be a cloud provider. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. A module can be implemented by software that contain patterns of instructions stored in a memory and executed by one or more processors, electronic circuits, and any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures can be made from the foregoing design and embodiments without departing from the scope afforded by the following claims, which scope is only limited by the claims when appropriately construed.

What is claimed is:

1. An apparatus, comprising:
a magnet in a wireless charger and a ferromagnetic target plate in a hearing assistance device are configured to create a magnetic retention force to hold the hearing assistance device in place when charging in order to control an amount of interference with a wireless charging between the wireless charger and the hearing assistance device, as well as
a housing for the wireless charger has one or more storage areas, where contours of the storage areas each conform to a shape of the hearing assistance device, where the magnet in the wireless charger and the ferromagnetic target plate in each hearing assistance device are positioned relative to a charging coil in the wireless charger and a receive coil in the hearing assistance device such that a first magnetic field supplied from the magnet to cause the magnetic retention force of the hearing assistance device to be controlled to not significantly interfere with a second magnetic field causing the wireless charging between the charging coil in the wireless charger and the receive coil in the hearing assistance device.

2. The apparatus of claim 1, where the contours of the storage areas each conform to the shape of the hearing assistance device to enable an insertion and a retention of the hearing assistance device correctly in the storage area of the wireless charger, where a first strength of the magnetic retention force between the ferromagnetic target plate in the hearing assistance device and the magnet in the wireless charger is set to be above a second strength of the magnetic retention force for the hearing assistance device to shake out of place in the wireless charger when a user is transporting the hearing assistance device.

3. The apparatus of claim 1, where a shape and slope of the housing of the wireless charger leading into the contours of the storage areas conforming to the shape of the hearing assistance device are configured to aid in repeatedly physically guiding the hearing assistance device into its proper location and alignment in the storage area conforming to the shape of the hearing assistance device.

4. The apparatus of claim 1, where the ferromagnetic target plate is located within the hearing assistance device such that a center of mass is located offset from a centerline of the magnet, where the offset between the center of mass of the ferromagnetic target plate and the centerline of the magnet is configured to create a force vector that pulls the hearing assistance device downward into the storage area and due to the contour shape of the storage area backwards towards a transmit charging coil so that the hearing assistance device abuts firmly against the housing of the wireless charger at a location of a receive charging coil in the hearing assistance device.

5. An apparatus, comprising:
a magnet in a wireless charger and a ferromagnetic target plate in a hearing assistance device are configured to create a magnetic retention force to hold the hearing assistance device in place when charging in order to control an amount of interference with a wireless charging between the wireless charger and the hearing assistance device, as well as
a housing for the wireless charger has one or more storage areas, where contours of the storage areas each conform to a shape of the hearing assistance device, where the magnet in the wireless charger is positioned relative to a transmit charging coil in the wireless charger and a receive charge coil in the hearing assistance device to control an amount of interference with a wireless charging between the wireless charger and the hearing assistance device, where the magnet is positioned at least one of i) to a side of the transmit charging coil in the wireless charger and the receive charge coil in the hearing assistance device, ii) to below the transmit charging coil in the wireless charger and the receive coil in the hearing assistance device and iii) not in between the transmit charging coil and receive coils.

6. An apparatus, comprising:
a magnet in a wireless charger and a ferromagnetic target plate in a hearing assistance device are configured to create a magnetic retention force to hold the hearing assistance device in place when charging in order to control an amount of interference with a wireless charging between the wireless charger and the hearing assistance device, as well as
a housing for the wireless charger has one or more storage areas, where contours of the storage areas each conform to a shape of the hearing assistance device, where the magnet in the wireless charger and the ferromagnetic target plate in the hearing assistance device are configured to cooperate with the contours of the storage areas that conform to the shape of the hearing assistance device to magnetically pull the hearing assistance device into its charge location and alignment between a transmit charge coil in the wireless charger and a receive coil in the hearing assistance device.

7. An apparatus, comprising:
a magnet in a wireless charger and a ferromagnetic target plate in a hearing assistance device are configured to create a magnetic retention force to hold the hearing assistance device in place when charging in order to control an amount of interference with a wireless charging between the wireless charger and the hearing assistance device, as well as
a housing for the wireless charger has one or more storage areas, where contours of the storage areas each conform to a shape of the hearing assistance device, where a distance of a gap between a transmit charge coil in the wireless charger and a receive charge coil in the hearing assistance device is controlled within a threshold amount by use of a foam that is made out of a compliant material, where a directional force applied by the compliant foam when compressed is configured to force the transmit charge coil to be pressed flat against a wall of the housing for the wireless charger.

8. The apparatus of claim 7, where the distance of the gap between the transmit charge coil in the wireless charger and the receive charge coil in the hearing assistance device is controlled within the threshold amount by integrating the transmit charge coil as part of a flexible printed circuit that is adhered to the compliant foam.

9. An apparatus, comprising:
a magnet in a wireless charger and a ferromagnetic target plate in a hearing assistance device are configured to create a magnetic retention force to hold the hearing assistance device in place when charging in order to control an amount of interference with a wireless charging between the wireless charger and the hearing assistance device, as well as
a housing for the wireless charger has one or more storage areas, where contours of the storage areas each conform to a shape of the hearing assistance device, where both the hearing assistance device and the wireless charger have a shield made out of ferrite material, where a transmit charging coil in the wireless charger and a receive charging coil in the hearing assistance device have the shield made out of ferritic material on i) a backside of the transmit charging coil as opposed to a front side that faces the receive charging coil and ii) a backside of the receive charging coil as opposed to a front side that faces the transmit charging coil.

10. A method for a wireless charging system, comprising:
configuring a magnet in a wireless charger and a ferromagnetic target plate in a hearing assistance device to create a magnetic retention force to hold the hearing assistance device in place when charging in order to control an amount of interference with a wireless charging between the wireless charger and the hearing assistance device,
configuring a housing for the wireless charger to have one or more storage areas, where contours of the storage areas each conform to a shape of the hearing assistance device, and
configuring the magnet in the wireless charger and the ferromagnetic target plate in each hearing assistance device to be positioned relative to a charging coil in the wireless charger and a receive coil in the hearing assistance device such that a first magnetic field supplied from the magnet to cause the magnetic retention force of the hearing assistance device to be controlled to not significantly interfere with a second magnetic field causing the wireless charging between the charging coil in the wireless charger and the receive coil in the hearing assistance device.

11. The method of claim 10, further comprising:
configuring the contours of the storage areas each conform to the shape of the hearing assistance device to enable an insertion and a retention of the hearing assistance device correctly in the storage area of the wireless charger, where a first strength of the magnetic retention force between the ferromagnetic target plate in the hearing assistance device and the magnet in the wireless charger is set to be above a second strength of the magnetic retention force for the hearing assistance device to shake out of place in the wireless charger when a user is transporting the hearing assistance device.

12. The method of claim 10, further comprising:
configuring the magnet in the wireless charger to be positioned relative to a transmit charging coil in the wireless charger and a receive charge coil in the hearing assistance device to control an amount of interference with a wireless charging between the wireless charger and the hearing assistance device, where the magnet is positioned at least one of i) to a side of the transmit charging coil in the wireless charger and the receive charge coil in the hearing assistance device, ii) to below the transmit charging coil in the wireless charger and the receive coil in the hearing assistance device and iii) not in between the transmit charging coil and receive coils.

13. The method of claim 10, further comprising:

configuring the magnet in the wireless charger and the ferromagnetic target plate in the hearing assistance device to cooperate with the contours of the storage areas that conform to the shape of the hearing assistance device to magnetically pull the hearing assistance device into its charge location and alignment between a transmit charge coil in the wireless charger and a receive coil in the hearing assistance device.

14. The method of claim 10, further comprising:

configuring a shape and slope of the housing of the wireless charger leading into the contours of the storage areas conforming to the shape of the hearing assistance device to aid in repeatedly physically guiding the hearing assistance device into its proper location and alignment in the storage area conforming to the shape of the hearing assistance device.

15. The method of claim 10, further comprising:

configuring the ferromagnetic target plate to be located within the hearing assistance device such that a center of mass is located offset from a centerline of the magnet, where the offset between the center of mass of the ferromagnetic target plate and the centerline of the magnet is configured to create a force vector that pulls the hearing assistance device downward into the storage area and due to the contour shape of the storage area backwards towards a transmit charging coil so that the hearing assistance device abuts firmly against the housing of the wireless charger at a location of a receive charging coil in the hearing assistance device.

16. The method of claim 10, further comprising:

configuring a distance of a gap between a transmit charge coil in the wireless charger and a receive charge coil in the hearing assistance device is controlled within a threshold amount by use of a foam that is made out of a compliant material, where a directional force applied by the compliant foam when compressed forces the transmit charge coil to be pressed flat against a wall of the housing for the wireless charger.

17. The apparatus method of claim 16, further comprising:

configuring the distance of the gap between the transmit charge coil in the wireless charger and the receive charge coil in the hearing assistance device to be controlled within the threshold amount by integrating the transmit charge coil as part of a flexible printed circuit that is adhered to the compliant foam.

18. The method of claim 10, further comprising:

configuring both the hearing assistance device and the wireless charger have a shield made out of ferrite material, where a transmit charging coil in the wireless charger and a receive charging coil in the hearing assistance device have the shield made out of ferritic material on i) a backside of the transmit charging coil as opposed to a front side that faces the receive charging coil and ii) a backside of the receive charging coil as opposed to a front side that faces the transmit charging coil.

* * * * *